United States Patent [19]

Fredriksen et al.

[11] Patent Number: 5,156,577
[45] Date of Patent: Oct. 20, 1992

[54] HYDROSTATIC SPLIT-TYPE POWER TRANSMISSION

[75] Inventors: Nils Fredriksen, Harsewinkel; Jan-Hendrik Mohr, Borken, both of Fed. Rep. of Germany

[73] Assignee: Claas oHG, Harsewinkel, Fed. Rep. of Germany

[21] Appl. No.: 816,556

[22] Filed: Jan. 6, 1992

[30] Foreign Application Priority Data

Jul. 4, 1991 [DE] Fed. Rep. of Germany ....... 4125988
Sep. 23, 1991 [DE] Fed. Rep. of Germany ....... 4131572

[51] Int. Cl.5 ............................................. F16H 39/04
[52] U.S. Cl. ....................................... 475/74; 475/81; 475/79
[58] Field of Search ........................ 475/74, 78, 79, 81

[56] References Cited

U.S. PATENT DOCUMENTS

| | | | |
|---|---|---|---|
| 4,754,664 | 7/1988 | Dick | 475/81 |
| 4,983,149 | 1/1991 | Kita | 475/79 X |
| 5,052,987 | 10/1991 | Hagin et al. | 475/74 X |

FOREIGN PATENT DOCUMENTS

| | | |
|---|---|---|
| 0195452 | 9/1986 | European Pat. Off. .............. 475/81 |
| 2423626 | 12/1974 | Fed. Rep. of Germany . |
| 3041865 | 6/1982 | Fed. Rep. of Germany . |
| 3605203 | 8/1987 | Fed. Rep. of Germany . |
| 3815780 | 12/1988 | Fed. Rep. of Germany . |
| 01460 | 2/1991 | World Int. Prop. O. ........... 475/81 |

Primary Examiner—Dirk Wright
Attorney, Agent, or Firm—Browdy and Neimark

[57] ABSTRACT

A power transmission having a four-shaft double planetary gear (I, II), which is driven on the one hand via a turning gear (WG) and on the other via a variable-displacement gear (HG) and is connectable on the power take-off side via selectable ratio gears via controllable clutches (K1A–K7A) to a power take-off shaft (AW3) and is connectable on the power take-off side retroactively via two of the selectable ratio gears (G4, G5) by means of a startup clutch (K0B), as a result of which with the turning gear (WG) disengaged, a fully hydraulic startup range is provided, and the other gear ranges are mechanically-hydraulically split in terms of power when the turning gear is engaged.

All the clutches are double claw clutches.

The startup clutch has a special construction, with a sliding sleeve.

The transmission is especially suitable for agricultural machines, because it is fully reversible. Other versions are shown.

22 Claims, 6 Drawing Sheets

HYDROSTATIC SPLIT-TYPE POWER TRANSMISSION

The invention relates to a power shift transmission with an infinitely adjustable hydrostatic adjustable mechanism, a four-shaft double planetary gear and following selectable ratio gears; an input shaft is permanently operatively connected via a first spur gear to the variable-displacement gear and can also be coupled in a controlled manner via a shiftable turning gear to a drive shaft of the rib of the second of the planetary gears and of the outer wheel of the first of the planetary gears, and an output shaft of the hydrostatic variable-displacement gear is connected via a toothed wheel gear to a sun wheel shaft on which the two sun wheels of the planetary gears are disposed, and a planet shaft of the first planetary gear is connectable in controlled fashion to a power take-off shaft, via first selectable ratio gears as well as an associated shift clutch, and an outer wheel shaft of the second planetary gear can be coupled in controlled fashion to the power take-off shaft via a further selectable ratio gear as well as an associated shift clutch.

This kind of transmission is known from German patent application 36 05 203 A1. It enables continuous step-free shifting of eight gears via a hydrostatic adjustment mechanism with a mechanical split, or branching, via a double planetary gear. In this embodiment, the shaft on which the selectable ratio gears of the 1st through 4th gears act comprises intermediate shafts, which can be connected in controlled fashion with a transmission output shaft via group gears with associated group shift clutches. Acceleration is done here with a friction clutch, which is subject to wear and entails energy losses, located before both the mechanical and the hydrostatic gears. The gear shift clutches are also synchronized and thus suffer wear. The clutches of the 1st through 4th gears are disposed on the hollow shafts of the planetary gear, and as a result are relatively large. There is no provision for operation of the overall transmission in reverse, which severely limits the utility of the transmission.

German patent application 38 15 780 A1 also discloses a hydrostatic-mechanical, split-type four-speed transmission, in which an input shaft is permanently operatively connected via a first spur gear to the variable-displacement gear, and furthermore, via a shiftable turning gear, can be coupled in controlled fashion with a planet shaft of a second of the planetary gears and the outer wheel of the first of the planetary gears, and an output shaft of the hydrostatic variable-displacement gear is connected via a toothed wheel gear to a sun wheel shaft on which the two sun wheels of the two planetary gears are disposed, and a planet shaft of the first planetary gear can be connected in controlled fashion to a shaft via first selectable ratio gears and associated shift clutches of 1st and 3rd gear, and an outer wheel shaft of the second planetary gear can be coupled in controlled fashion to the shaft via further selectable ratio gears and associated shift clutches of 2nd and 4th gear. This transmission produces the same degree of conversion in the forward and reverse directions, but it is limited because it has only four speeds and so can be used only for automobiles, but not for heavy-duty farm machinery. Moreover, the turning gear is shifted with synchronizing clutches, which are subject to wear and the synchronization of which entails an energy loss.

A hydrostatic-mechanical Fottinger coupling transmission with an input-side torque split is also known, from German patent 31 47 447, which includes two three-shaft epicyclic gears I and II, of which a differential shaft of the first epicyclic gear I and the summation shaft of the second epicyclic gear II form a unit with the driving shaft, and of which the second differential shaft of the first epicyclic gear I is coupled to a differential shaft of the second epicyclic gear II and is connected to the driving shaft via a hydrostatic variable-displacement gear, and of which finally the summation shaft of the first epicyclic gear I, on the hand, and the second differential shaft of the second epicyclic gear II, on the other, can act in alternation via higher transmission group gears, so that by variably running through the adjusting range of the hydrostatic gear, a plurality of stepless successive adjusting ranges form the total adjusting range of the transmission, the higher transmission output side gears being adapted in their speed increasing ratios such that the adjusting range change at synchronized rpm takes place without load and without interruption of traction force on both sides of the clutches to be shifted, but a friction clutch is provided for acceleration. The known transmission has four forward speeds and one reverse gear and is thus suitable for passenger car operation; the total conversion of the transmission amounts approximately to a factor of 8, which is usually not adequate for utility vehicles.

A four-speed transmission with hydrostatic split power, or power branching, is also known from German Patent Disclosure Document DE-OS 24 23 626, in which an increase in efficiency can be attained by providing that at operating points in which the driven shaft of the hydraulic converter is practically at a standstill, it is stopped toward the housing by a clutch, so that only the mechanical gear is operative, and the converter is idling, virtually without loss. It is also provided that at operating points in which the input shaft and output shaft of the hydraulic converter are in synchronism, these shafts are firmly connected to one another by a further, separate clutch, so that the converter rotates with them with low loss, and the power is transmitted purely mechanically.

The object of the invention is to improve the hydraulically-mechanically adjustable coupling transmission described at the outset above so that the total conversion in the transmission is available in both travel directions, the number of synchronizing clutches is reduced, and the total conversion is increased by a purely hydraulic acceleration range, without using an addition startup gear.

This object is attained in that

- the input shaft is connectable to the drive shaft by means of a turning gear that can be turned on and off;
- the planet shaft is connectable via a startup shift clutch
  - to the sun wheel shaft, or
  - to the outer wheel shaft, via one of the selectable ratio gears disposed thereon, because the outer wheel shaft can be coupled retroactively in succession with one of the adjacent-speed selectable ratio gears disposed on the sun wheel shaft, and
- that in a fully hydrostatic operating range, the turning gear is controllably disengaged and the startup shift clutch is closed.

Advantageous embodiments are defined by the dependent claims.

The toothed wheels of the selectable ratio gears are each disposed in the order of the speeds alternatingly on the planet shaft or the outer wheel shaft; counterpart wheels are each assigned to the power take-off shaft.

Coupling together two of the shafts of the double planetary gear advantageous produces startup shifting with fully hydraulic control via the hydraulic variable-displacement gear. This makes it possible to dispense with a mechanical clutch, which involves wear, between the driving motor and the transmission, A turning gear that is shiftable forward or in reverse out of a neutral position precedes the transmission, so that the entire conversion range of the transmission assembly is available for both directions of operation of the transmission.

The number of speeds, i.e. gears, and thus the size of the conversion range is so great, optionally by means of the two-stage group gear following the selectable ratio gears, that the entire transmission is particularly well suited for self-propelled agricultural and forestry operating equipment.

The transmission is advantageously controlled by an electronic control unit in such a way that for shifting gears the clutches that produce the various gear shifting actions are actuated in increasing or decreasing order in a coupling manner as a function of predetermining shifting criteria, and that during the periods of time in which the gears are shifted, the variable-displacement gear is operated in regulated fashion or is changed to the opposite position, in the event that further upshifting or downshifting is to be done.

The various gear assemblies are embodied such that only a few synchronized clutches are needed. The control unit evaluates rpm reports from the transmission trains to be coupled, in such a way that the claw clutches are each shifted whenever the shafts to be joined are turning in synchronized fashion. It is preferably provided that pairs of clutches to be actuated alternatively be used, which keeps the expenditure low.

The output shaft can be extended directly to the outside or connected to one or more axles of a vehicle via a differential gear and optionally a further adaptation gear.

In a first advantageous embodiment, a power-branched, or split, 7-speed transmission having an additional fully hydrostatic startup range is created; only four double claw clutches with a middle position are needed for shifting gears, including the startup range, and a further double claw clutch with a middle position for the turning gear is provided. This is attained by combining the 6th gear clutch and the startup shift clutch, either by coupling the sun wheel shaft to the adjacent planet shaft or by connecting the planet shaft, embodied as a hollow shaft, to the 6th gear transmission wheel that is rotatably supported on it. The other three double-gear clutches are disposed concentrically with the power take-off shaft and are therefore smaller in diameter.

In a second advantageous embodiment, a 4-speed transmission is disposed on the power take-off shaft, which functions as a first intermediate shaft, and this shaft is followed by a further two-stage higher transmission output side gear, so that a total of eight power-branched speed stages can be shifted in combination, preceded by the fully hydrostatic startup stage. Coupling together the planet shaft and the outer wheel shaft is done via a novel startup clutch, with which the transmission wheels of 1st and 2nd gear, which are rotatably supported on the power take-off shaft, are coupled to one another. This startup clutch is embodied as a double clutch with a neutral position, and in its other operative position it couples the 3rd gear transmission wheel to the power take-off shaft.

A clutch of this kind with the same construction, which is to be coupled by a hollow shaft to the inner bearing shaft or, spanning the first clutch member, to a further hollow shaft located thereon, is provided in order, on one side of the neutral position, to connect a 1st gear transmission wheel to the power take-off shaft and, on the other side, to couple this transmission wheel to a transmission wheel, supported rotatably on the power take-off shaft, of the higher transmission output side gear. This transmission has fewer sets of toothed wheels than the one described before, although it has one more speed. The spanning double clutches reduce the expenditure for adjusting means.

A third advantageous embodiment of the transmission is a 7-speed transmission with a fully hydraulic startup range. One again one of the spanning double clutches is provided. On one side of the neutral position, it connects the 4th and 5th transmission wheels, rotatably supported on the power take-off shaft, to the startup clutch, and on the other side it connects the aforementioned 4th gear transmission wheel to the power take-off shaft. In this transmission as well, for the seven speeds, only four double claw clutches, without synchronizing means, are present.

Four double clutches are disposed on one shaft with a common center of rotation, which has constructional advantages. All the clutches should be embodied identically, which is simple from the standpoint of control. In each speed, only two of the clutches are engaged at any time, including the turning clutch.

From the examples it will become apparent that in the fully hydraulic operating range it is necessary to connect two of shafts of the planetary gear directly or by means of mechanical transmissions. Preferably, the shafts that drive the selectable ratio gears in alternation are coupled to one another in the startup range; one selectable ratio gear on the planet shaft and one selectable ratio gear of the next lower speed in order is connected in series to the outer wheel shaft of the planetary gear. The planetary gear set with this coupling of its shafts thus operates via the novel clutch and has no directly connected connecting shafts. This spanning clutch embodiment can also be used with transmissions having other numbers of speeds.

The space utilization of the transmission is very good, because the small startup clutch is disposed in the region next to the extended planetary gear assembly.

Advantageous features are shown in FIGS. 1–7.

Figure 1:
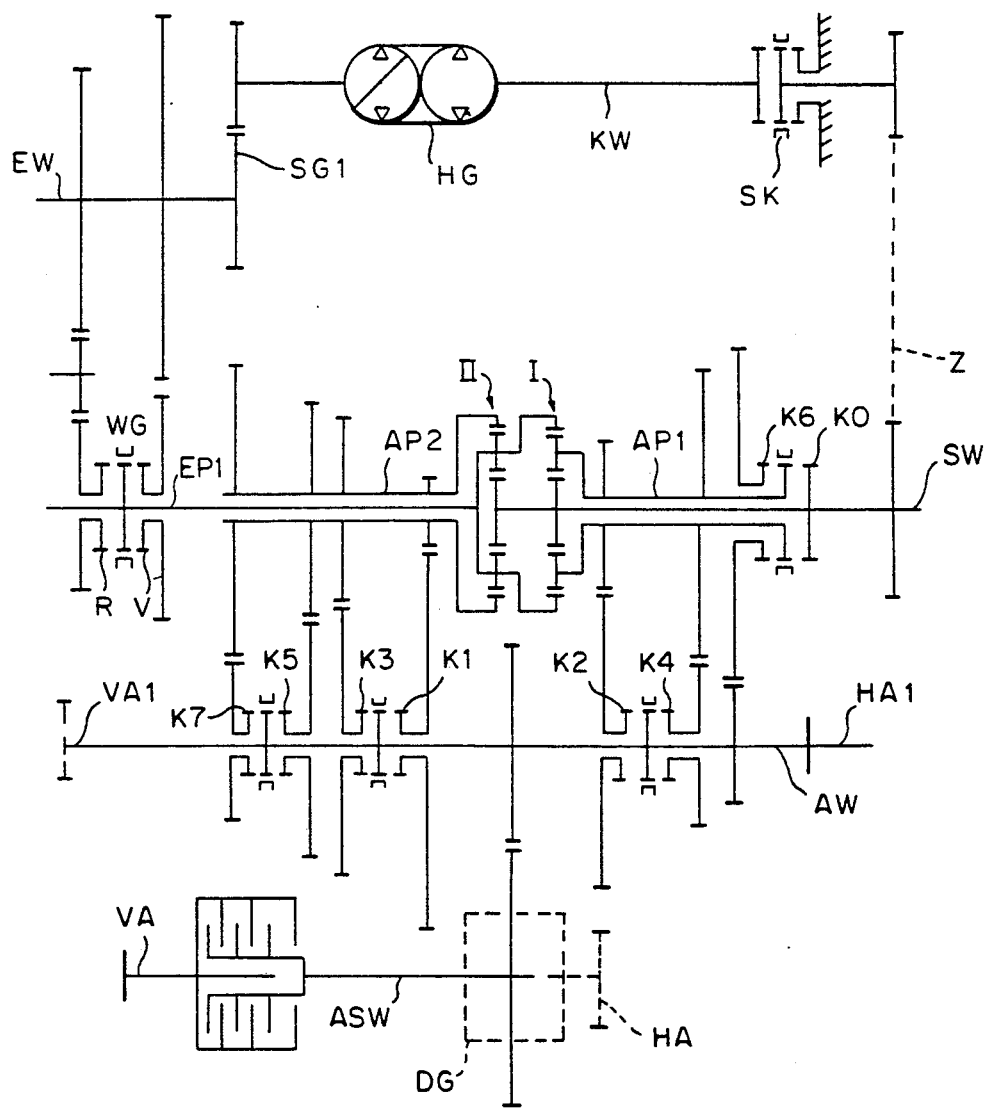
FIG. 1 shows a transmission layout of a 7-speed transmission with a startup range.

The first exemplary embodiment, FIG. 1, shows a transmission the input shaft (EW) of which, via a spur gear (SG1), drives a hydraulic variable-displacement gear (HG), the output shaft (KW) of which, via a toothed wheel stage (Z), drives a sun wheel shaft (SW) of a double planetary gear (I, II), which is connected on the other side to a drive shaft (EP1), which is connectable to the input shaft (EW) via a turning gear (WG) by means of a turning gear clutch (R, V), or is to be left in a neutral position, and which is connected to the rib of the second planetary gear assembly (II) and to the outer wheel of the first planetary gear assembly (I).

The transmission wheels of the odd-numbered gears 1, 3, 5 and 7 are disposed on the outer wheel shaft (AP2), embodied as a hollow shaft, of the second planetary gear (II), and the transmission wheels of the even-numbered speeds, or gears, 2, 4 and 6 are disposed on the outer wheel shaft (AP1), embodied as a hollow shaft, of the first planetary gear (I), of which the 6th gear wheel is rotatably supported there. The matching wheels of the selectable ratio gears are disposed on the power take-off shaft (AW), so that they can be coupled thereto by an associated clutch (K1, K7).

The clutches of the 1st and 3rd gears (K1, K3), 2nd and 4th gears (K2, K4) and 5th and 7th gears (K5, K7) are each embodied in pairs as claw clutches, which have a neutral position in the middle. The 6th gear clutch is also part of a double clutch, which on one side of the neutral position establishes a connection between the sixth selectable ratio gear and the planet shaft and on the other side thereof engages the startup shift clutch (K0), which connects the planet shaft to the sun wheel shaft.

An output shaft can extend to the outside immediately laterally of the power take-off shaft, and via a differential gear (DG), a drive shaft of a vehicle can be connected to it, if the entire transmission is embodied as a drive block.

For economical travel in operating points in which the variable-displacement gear does not transmit any power, a special clutch (SK) is provided, which depending on the operating point at the time, under suitable control, either shifts the variable displacement gear through to the sun wheel shaft or fixes the sun wheel shaft in terms of the gear box.

Because of the low number of five double clutches and the special clutch (SK), the entire transmission has a very compact structure and a simple control layout, because no synchronization whatever is necessary, and for clutch actuating care need merely be taken that the rotational speed of the parts to be coupled together be the same.

The transmission is especially suitable if the spacing between the front and rear axles of a vehicle is short; the connections of the front axle (VA, VA1) or rear axle (HA, HA1) can be supplied either directly from the power take-off shaft (AW) or from the differential gear (DG).

The clutch layout, which has two shifted clutches in each case for all 7 speeds and for the startup range, is shown below.

| gear/clutch | Shifting logic | | | | | | | | |
| --- | --- | --- | --- | --- | --- | --- | --- | --- | --- |
| | K0 | K1 | K2 | K3 | K4 | K5 | K6 | K7 | R/V |
| 0 | X | X | | | | | | | |
| 1 | | X | | | | | | | x |
| 2 | | | X | | | | | | X |
| 3 | | | | X | | | | | x |
| 4 | | | | | X | | | | x |
| 5 | | | | | | X | | | X |
| 6 | | | | | | | X | | X |
| 7 | | | | | | | | X | X |

Figure 2:
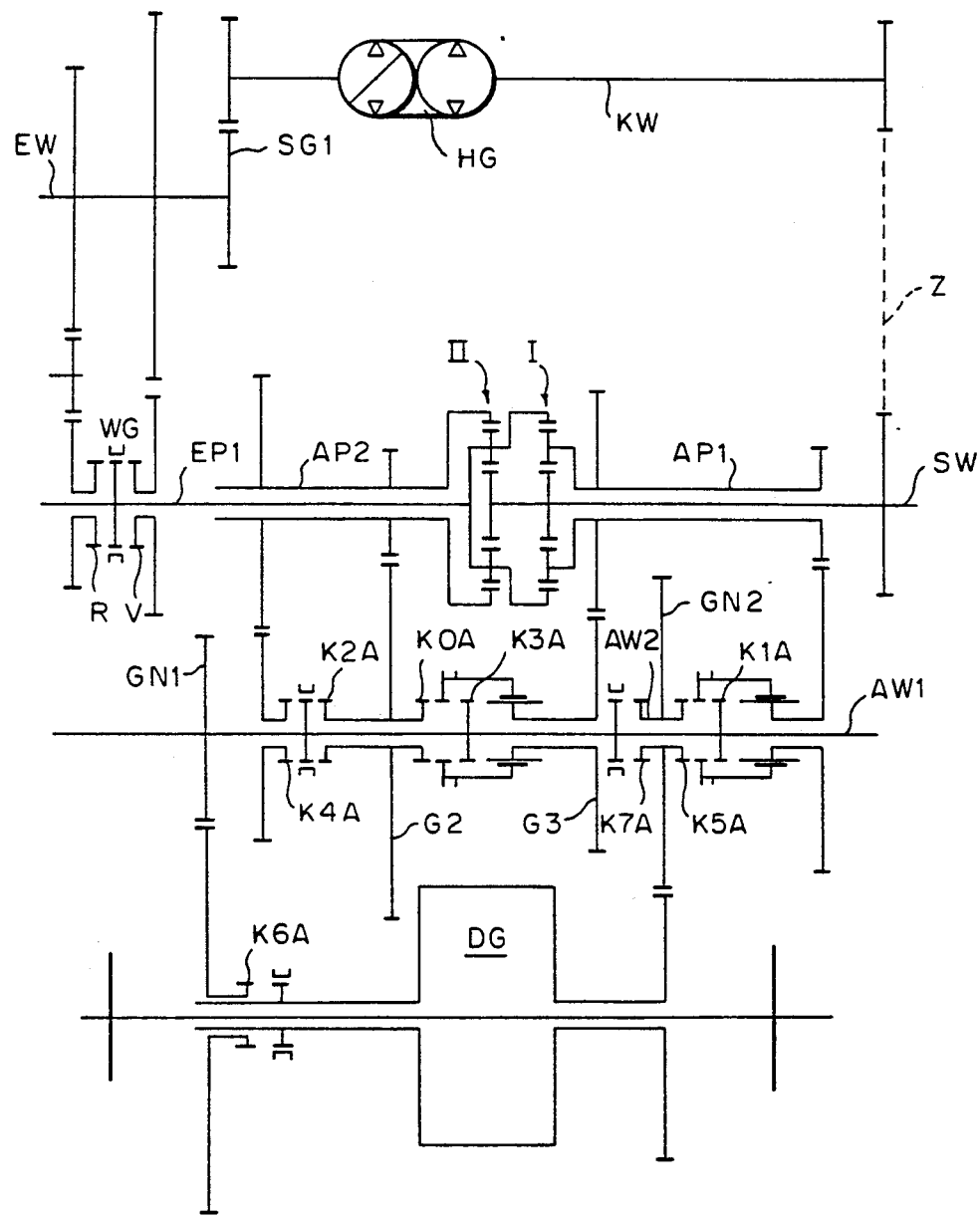
FIG. 2 shows a transmission layout with a startup range and an 8-speed transmission, which comprises gears connected in series with one another.

FIG. 2 shows a further transmission layout, which on the input side with respect to the turning gear (WG) and the turning gear clutch (R, V) the variable-displacement gear (HD) and actuating of the double planetary gear (I, II) is embodied identically to the first embodiment. The transmission wheels of the 1st and 3rd gears, i.e. speeds, are disposed on the planet shaft (AB1), and the transmission wheels of the 2nd and 4th gears are disposed on the outer wheel shaft (AP2) of the second planetary gear. All the matching wheels for gears 1–4 are supported rotatably on the power take-off shaft (AB1) and are connectable to it by clutches (K1A–K4A). From the power take-off shaft (AB1), a first higher transmission output side gear (GN1) should be connected by a clutch (K6) to a differential gear shaft (DW) of a differential gear (DG). A second power takeoff shaft (AW2), which is embodied as a hollow shaft, is rotatably supported on the power take-off shaft (AW1) and is connected to the differential gear shaft (DW) by a second higher transmission output side gear (GN2).

The gears of the 2nd and 4th speeds are connectable in a controlled manner to the power take-off shaft via a double claw clutch. The 1st speed and 3rd speed can also each be connected with a bridging clutch, in one position of these double clutches, to the power take-off shaft (AW1). The 3rd gear double clutch also serves, via a hollow shaft, to connect the 3rd gear to the second selectable ratio gear by means of the startup clutch (K0A). The other bridging clutch serves in its second position to connect the first selectable ratio gear, by means of a 5th gear clutch (K5A), to the second power take-off shaft (AW2), so that directly from there, in 5th gear, force is transmitted onward via the second higher transmission output side gear. For the other higher gears, a single clutch (K7A) connects the second higher-stage group gear to the first power take-off shaft, which in turn is to be driven by the 2nd, 3rd or 4th gear, as applicable.

For the startup range it is provided that as in the four lower gears, the clutch (K6A) of the first higher transmission output side gear (GN1) is closed, and that the 1st gear clutch (K1A) and the startup shift clutch (K0A) are actuated. In this way, the startup output is transferred to the differential gear (DG) via the hydrostatic gear (HG) and then through the planetary gear (I, II), and via a higher transmission output side gear (GN1, GN2). A power split via a hydraulic and a mechanical branch thus does not occur; instead, after the hydraulic transmission, the power is transmitted to the planet shaft over a plurality of routes in the mechanical range. The planetary gear acts as a speed increasing element, so that at the end of the fully hydrostatic gear, a synchronized rpm prevails at the turning clutch, and this clutch can then be engaged without synchronizing means.

Aside from the 4th gear clutch (K4) and the 7th gear clutch (K7A), all the clutches are simple claw clutches; the two aforementioned clutches have synchronizing devices for the transition to the upper or lower speed group range.

The shifting layout for the arrangement of FIG. 2 is shown below. The letters A and E stand for putting out of synchronization and into synchronization, respectively, which should be done in each case at suitable times; the synchronization processes are reversed for downshifting.

| gear/clutch | V/R | K01 | K1A | K2A | K3A | K4A | K5A | K6A | K7A | K8A |
|---|---|---|---|---|---|---|---|---|---|---|
| 0 | | X | X | | | | | X | | |
| 1 | X | | X | | | | | X | | |
| 2 | X | | | X | | | | X | | |
| 3 | X | | | | X | | | X | | |
| 4 | X | | | | | X | | X | | |
| 5 | X | | | | | A/E | X | E/A | | |
| 6 | X | | | X | | | | | X | |
| 7 | X | | | | X | | | | X | |
| 8 | X | | | | | X | | | X | |

Figure 3:
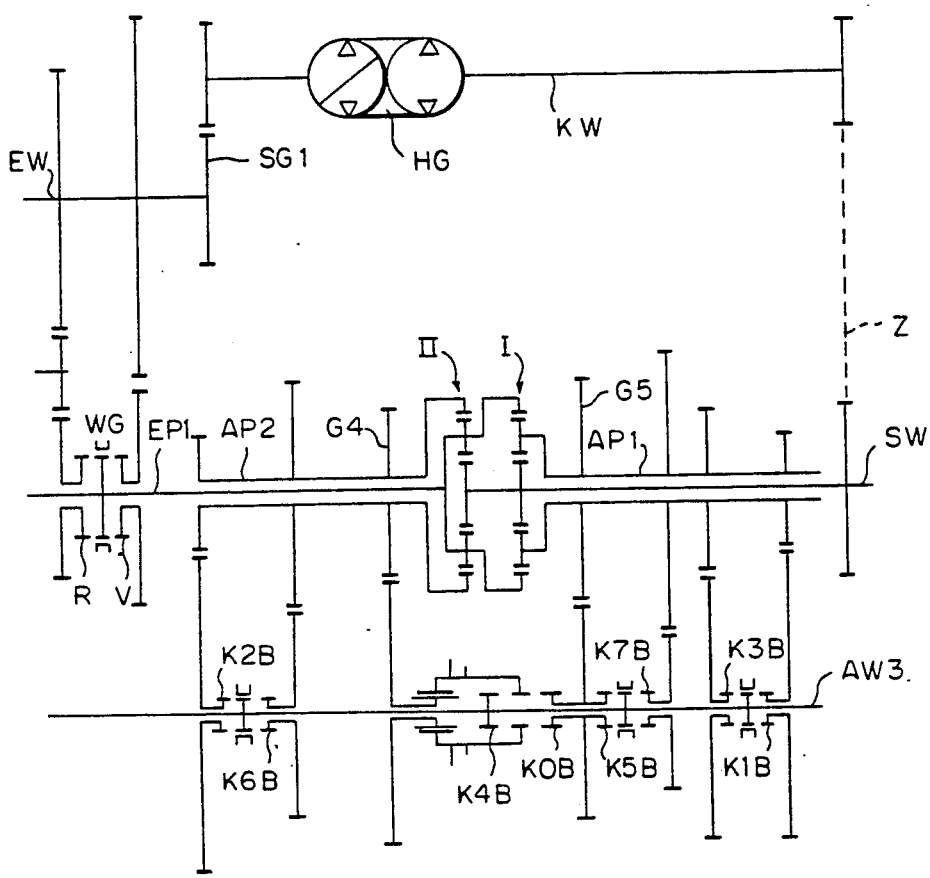
FIG. 3 shows a further 7-speed transmission with a startup range.

Another advantageous embodiment is shown in FIG. 3, in which the input shaft (EW), the turning gear (WG), the variable displacement gear (HG) and the double planetary gear (I, II) are all embodied in the same way as in the other versions.

The transmission wheels of the odd-numbered gears 1, 3, 5 and 7 are disposed on the planet shaft, and the transmissions of the even-numbered gears 2, 4 and 6 are disposed on the outer wheel shaft. All the matching wheels of the 7 gears are rotatably supported on the power take-off shaft (SW3) and are to be connected to it controllably by means of claw clutches. A total of four double clutches in the selectable ratio gear is provided, of which one engages the 1st and 3rd gear clutches (K1B, K3B), another engages the 2nd and 6th gear clutches (K2B, K6B), a third engages the clutches (K5B, K7B) of a 5th and 7th gear, and a spanning clutch on one side of the neutral position engages the clutch (K4B) of the 4th gear (G4) to the power take-off shaft (AW3) and on the other side of the neutral position engages the startup clutch (K0B), which connects the transmission of the 4th gear (G4) and the transmission of the 5th gear (G5) directly to one another via a hollow shaft or sliding sleeve.

The disposition of the double clutches around the power take-off shaft (AW3) produces a very simple and compact design.

The shifting layout of the third version is equivalent to that of the first transmission version described.

Figure 4:
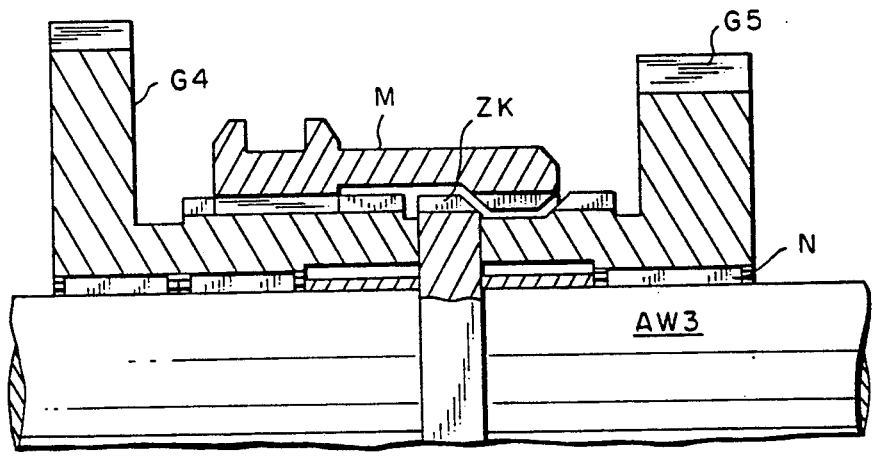
FIG. 4 shows a spanning double claw clutch, in section.

FIG. 4 is a cross section through a bridging clutch of the kind used in the second and third versions. This clutch comprises a sliding sleeve (M), which is supported on a hollow shaft bearing extension of a first toothed wheel, which for instance belongs to a 4th gear (G), in FIG. 3, and on the power take-off shaft (AB3), on the other side of which a toothed wheel of the 5th gear (G5) is likewise rotatably supported. Located between the aforementioned two toothed wheels with their bearing extensions is a clutch wheel (KR), which is firmly joined to the power take-off shaft (AB3). The sliding sleeve (M) has an internal toothed ring, which is axially displaceably and form-fittingly supported on an external toothing on the hollow shaft of the toothed wheel of the 4th gear and on the other end has an internal toothed ring with clutch toothing that is embodied to fit external toothing of the clutch wheel (KR) and external toothing of the hollow shaft extension of the toothed wheel of the 5th gear (G5). On the outside, the sliding sleeve (M) has an encompassing groove (N), which is engaged in a known manner by clutch adjusting means with a clutch fork, so that the sleeve (M), by an axial displacement, is form-fittingly connected either to the clutch wheel (KR) or to the hollow shaft extension of the wheel of the 5th gear (G5).

The support of the two transmission wheel bushings of the wheels of the 4th and 5th gears (G4, G5) is preferably effected with low friction via needle bearings. The type of bridging clutch described may also be used selectively for other hollow shafts, which are supported on an internal shaft, in order to connect the internal shaft to one of the hollow shafts or to connect the hollow shafts to one another, with a middle neutral position being provided. This feature is considered to represent an independent inventive clutch construction.

Figure 5:
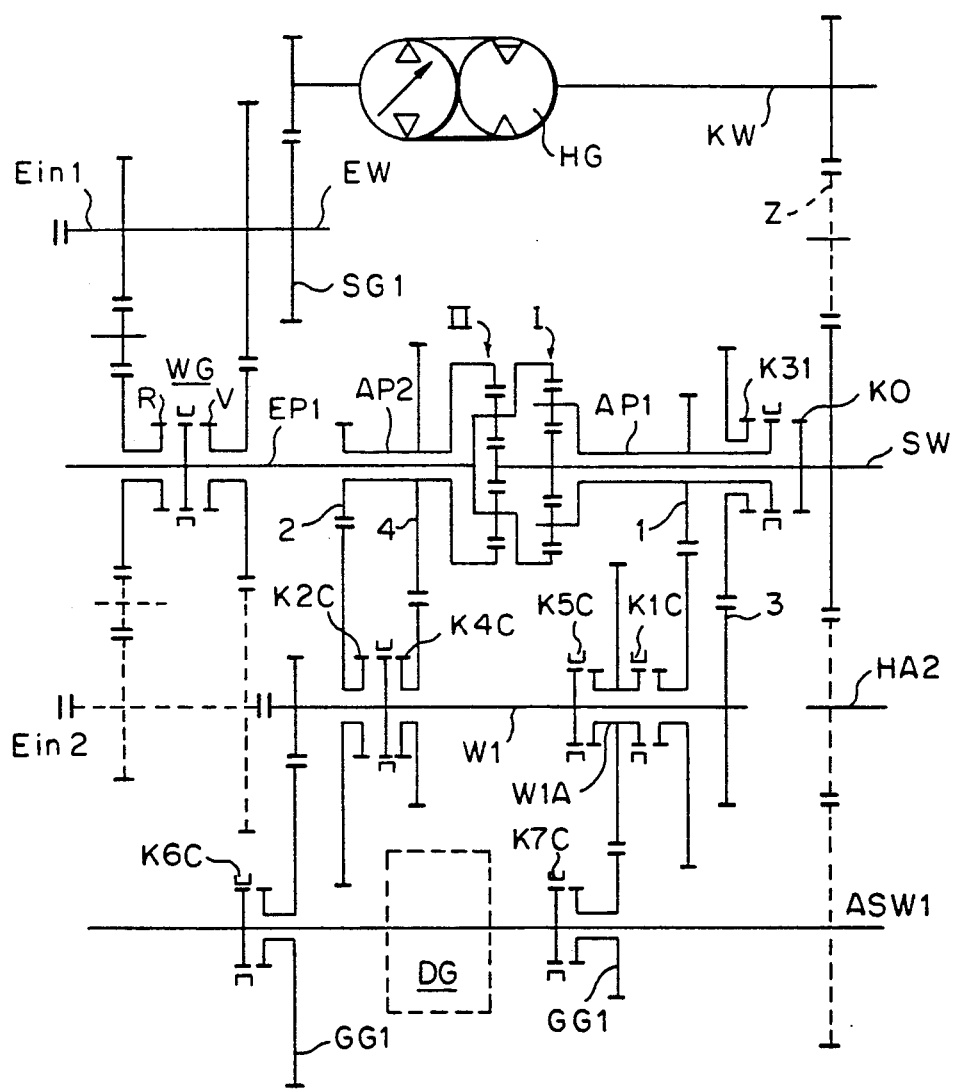
FIG. 5 shows a fourth version in the form of an 8-speed transmission.

FIG. 5 shows the shifting layout of a transmission block in which a hydraulic variable-displacement gear (HG), a turning gear (WG), a double planetary gear (I, II), a four-stage toothed wheel gear and a group gear (GG1) are disposed. The transmission input (Ein1) is connected to an input shaft (EW), which drives the variable-displacement gear (HG) via a first spur gear (SG1) and via further spur gears is coupled directly and inversely to the turning gear (WG). Via claw clutches (R, V), this turning gear (WG), turning forward or reverse out of a neutral position, is connected to a first planet shaft (EP1) of one of the planetary gears (II) and to the outer wheel of the other of the planetary gears (I). The two sun wheels are connected to the output shaft (KW) of the variable-displacement gear (HG) via a toothed wheel stage (Z).

The outer wheel shaft (AP2) of the one planetary gear (I) has toothed wheels (2, 4) of tooth wheel gear stages of a 2nd and 4th gear, the matching wheels of which are supported on an intermediate shaft (W1) and can be selectively connected to it via a pair of clutches (K2C, K4C). The planet shaft (AP1) of the other planetary gear (I) has toothed wheels (1, 3) of a 1st and 3rd gear. The matching toothed wheel of the 1st gear is rotatably supported on the planet wheel (AP1) and is connectable to it in a controlled manner by means of a claw clutch (K31). The matching wheel for it is connected to the first intermediate shaft (W1).

The two intermediate shafts (W1, W1A) are each connectable to the output shaft (ASW1) selectively via a respective group gear part, by means of one associated shift clutch (K6C, K7C) each. In addition, the two intermediate shafts (W1, W1A) are connectable to one another by means of a clutch (K5C).

The output shaft (ASW) is either extended directly to the outside or coupled to a differential gear (DG) of an axle drive or via a toothed wheel gear, which is shown in dashed lines, to an output shaft journal (HA1), which in a block construction version is located, preferably coaxially associated with an input shaft journal (Ein2) in the gearbox, the input shaft stub having a toothed wheel coupling, shown in dashed lines, to the turning gear input and to the variable-displacement gear (HG).

For the fully hydrostatic startup, a shift clutch (K0) is provided between the sun wheel shaft (SW) and the planet shaft (AP1). To simplify the construction, this planetary gear shaft clutch (K0) is combined with the clutch (K31) of the 3rd gear as a clutch pair and should be actuated in alternation.

By connecting the sun wheel shaft (SW) to the planet shaft (AP1) by means of the shift clutch (K0), a coupled unit, which is driven from the sun wheel shaft (SW) via the variable-displacement gear, is formed from the entire planetary gear. The turning gear (WG) is turned off then.

The entire shifting layout of the eight gears is shown in the following table:

5th to the 6th speed ranges, to which end the clutch (K5C) that connects the intermediate shaft part (W1, W1A) is embodied as a synchronized clutch, and upon downshifting from the 5th to the 4th speed range, to which end the clutch (K4C) of the 4th gear is embodied as a synchronized clutch.

Overall, this transmission, with a suitable design with seven split-type speeds, or gears, produces a conversion range of approximately 40:1.

Figure 6:
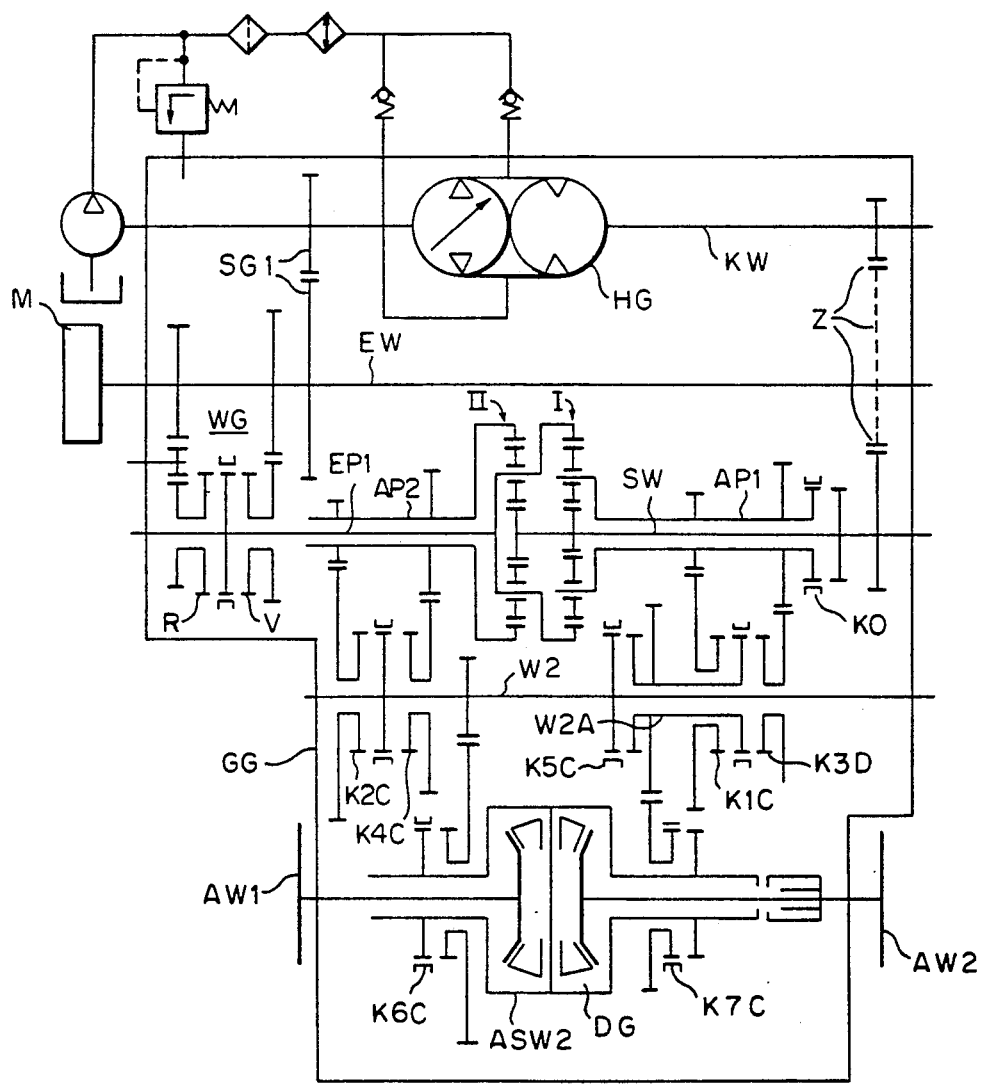
FIG. 6 shows a fifth version in the form of an 8-speed transmission.

FIG. 6 shows a variant of the above-described transmission, in which the planetary gear shaft clutch (K0) is a single clutch, and the 1st and 3rd selectable ratio gear clutches (K1C, K3D) are combined in the form of a clutch pair that can be shifted in alternation. To this end, the power take-off wheels of these selectable ratio gears are each rotatably supported on one of the intermediate shafts (W2, W2A), and the associated driven Shifting logic for FIG. 5
gear 0: fully hydrostatic
gears 2-8: power branched, i.e. split-type

| gear | V/R | K0 | K1C | K2C | K31 | K4C | K5C | K6C | K7C | K8C |
|---|---|---|---|---|---|---|---|---|---|---|
| Upshifting: | | | | | | | | | | |
| 0 | | X | X | X | | | | X | | |
| 2 | X | | X | X | | | | X | | |
| 3 | X | | X | | X | | | X | | |
| 4 | X | | X | | | X | | X | | |
| 5 | X | | X | | | A | E | | X | |
| 7 | X | | | | X | | X | | X | |
| 8 | X | | | | | X | X | | X | |
| Downshifting: | | | | | | | | | | |
| 8 | X | | | | | X | X | | X | |
| 7 | X | | | | X | | X | | X | |
| 6 | X | | | X | | | X | | X | |
| 5 | X | | X | | | E | A | | X | |
| 4 | X | | X | | | X | | X | | |
| 3 | X | | X | | | | | X | | |
| 2 | X | | X | X | | | | X | | |
| 0 | | X | X | X | | | | X | | |

X = engaged
A = load-free, preparatory disengagement (synchronized)
E = load-free, preparatory engagement (synchronizing)

Startup and braking to a stop are provided fully hydraulically both with the 2nd gear clutch (K2C) engaged, by means of coupling the double planetary gear (I, II), and with the 4th gear clutch (K4C) engaged, as the following switching layout shows. Since upon startup the respective clutches (V, R) of the turning gear (WG) are disengaged, the startup rpm ranges in each case begin below the 2nd and 4th gears, so that these ranges are labeled as the 1st and 3rd gears, respectively, in the tables, even though the selectable ratio gears of the 1st and 3rd gears transmit no power then. Starting up in a higher gear is advantageous, particularly in low-load operation.

wheels are firmly joined to their drive shaft (AP). In this connection it is provided that the clutch (K1C) of the first selectable ratio gear also be embodied as a synchronizing clutch. The transmission shifting layouts are as already shown for FIG. 1. The reference symbols for the same elements are the same, so that the description fits accordingly. The differential gear (DG) with the power take-off shaft (AW1, AW2) is shown in greater detail here. Advantageously, the above-described transmissions can also be started up or braked fully hydrostatically even in the speed ranges below 6th and below 8th gear, by shifting into these gears 5× and 7× with the clutches disengaged and the planetary gear

| gear | V/R | K0 | K1C | K2C | K31 | K4C | K5C | K6C | K7C | K8C |
|---|---|---|---|---|---|---|---|---|---|---|
| 3* | | X | X | | | X | | X | | |
| 4 | X | | X | | | X | | X | | |
| 5 | X | | X | | | A | E | | X | |
| 7 | X | | | | X | | X | | X | |
| 8 | X | | | | | X | X | | X | |
| 8 | X | | | | | X | X | | X | |
| 7 | X | | | | X | | X | | X | |
| 6 | X | | | X | | | X | | X | |
| 5 | X | | X | | | E | A | | X | |
| 4 | X | | X | | | X | | X | | |
| 3* | | X | X | | | X | | X | | |

Synchronizing of the intermediate shaft (W1) is necessary only when upshifting at the transition from the shaft clutch (K0) closed, with the other clutches engaged in accordance with the higher gear 6 or 8.

By means of the planetary gear shaft clutch (K0), the output shaft (AP1) of the first planetary gear (I) is coupled to the sun wheel shaft (SW). The entire planetary gear group (I, II) thus revolves as a coupled unit. Instead of a rigid coupling of the two planetary gear shafts (AP1, SW), a corresponding effect can also be attained by coupling a different pair of the planetary gear shafts (EP1, AP2, AP1, SW). Coupling them via a transmissional connection with a fixed rpm ratio also affords the opportunity of startup with the converter transmission with the turning gear disengaged. Via the double planetary gear, a defined speed increasing ratio is then obtained in each case, and thus the turning gear (WG) can be disengaged or engaged synchronously in each case at the end of the fully hydrostatic transmission range, and the corresponding direct or indirect coupling of the planetary gear shafts (EP1, AP2, AP, SW) can be achieved.

Figure 7:
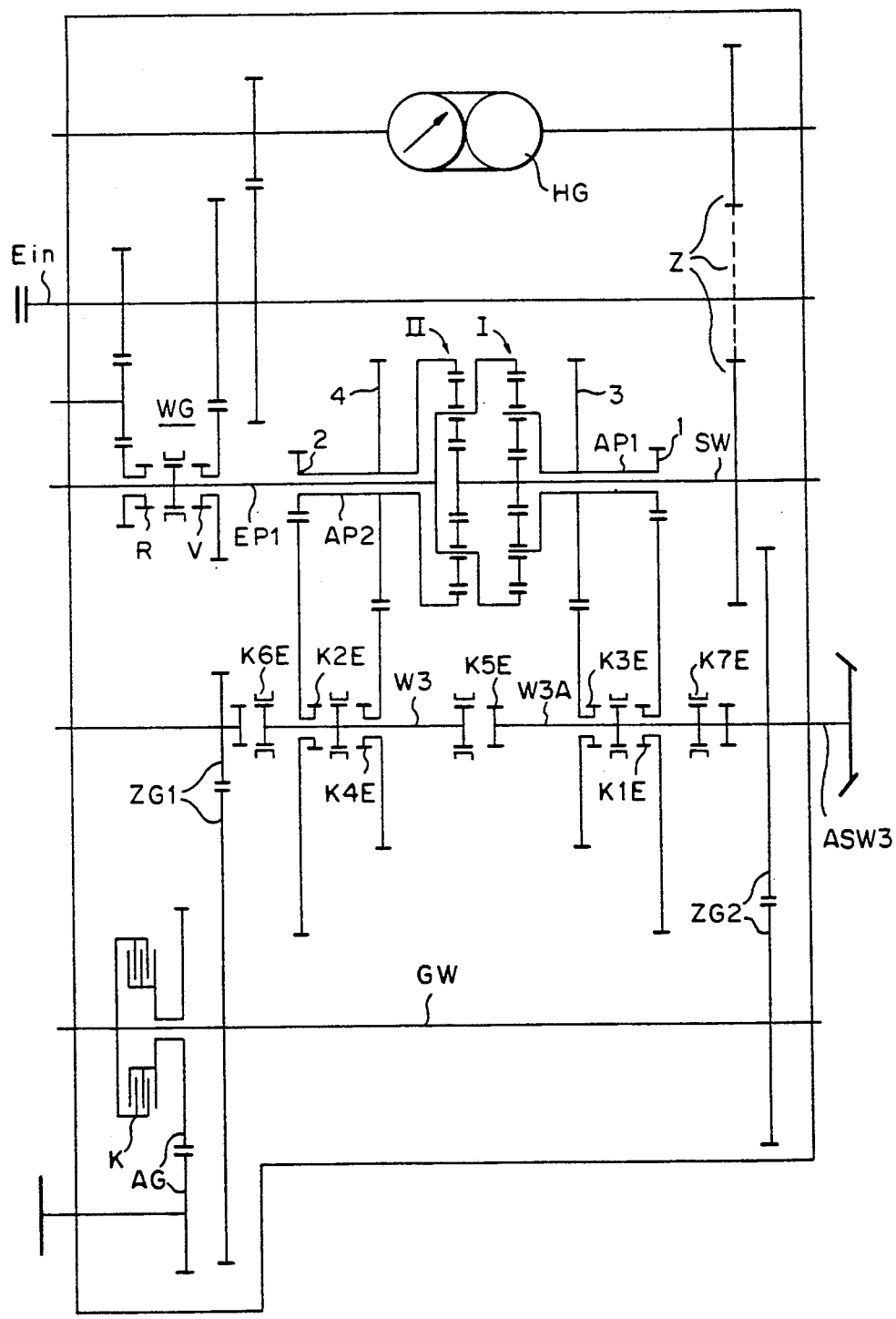
FIG. 7 shows a sixth version in the form of an 8-speed transmission.

FIG. 7 shows a further transmission shifting embodiment of this kind, in which the two intermediate shafts (W3, W3A) are to be connected together via the shaft coupling (K5E), and the two power take-off shafts (AP1, AP2) of the planetary gears (I, II) are disposed such that via a respective transmission stage 1 or 3 or 2 or 4, which are disposed on the two intermediate shafts (W3, W3A) can each be coupled respectively to this intermediate shaft (W3, W3A) and as a result are to be connected to one another indirectly in a fixed rpm ratio. In this way, a special planetary gear shaft clutch along with its adjusting apparatus is not necessary in order to operate the transmission fully hydrostatically for startup without an engaged turning gear (WG); seven split-type speed ranges are provided, instead of eight in the other arrangement. The following table shows the shifting layout for the total of eight speed ranges, which can be operated in forward and in reverse.

| gear | V/R | K1E | K2E | K3E | K4E | K5E | K6E | K7E |
|---|---|---|---|---|---|---|---|---|
| Shifting logic for FIG. 7 ||||||||||
| Upshifting: |||||||||
| 0 |   | X | X |   |   |   | X | X |
| 2 | X |   | X |   |   |   | X | X |
| 3 | X |   |   | X |   |   | X | X |
| 4 | X | E |   |   | X | A | X |   |
| 5 | X | X | E |   | A |   |   | X |
| 7 | X |   |   |   |   | X | X |   |
| 8 | X |   |   |   |   | X | X | X |
| Downshifting: |||||||||
| 8 | X |   |   |   | X | X |   | X |
| 7 | X |   |   | X |   | X |   | X |
| 6 | X |   | X |   |   | X |   | X |
| 5 | X | X |   |   | E | A |   | X |
| 4 | X | A |   | E | X |   | X |   |
| 3 | X |   |   | X |   |   | X | X |
| 2 | X |   | X |   |   |   | X | X |
| 0 |   | X | X |   |   |   | X | X |

X = clutch engaged
A = load-free, preparatory disengagement (synchronized)
E = load-free, preparatory engagement (synchronizing)

The speed increasing range of the 1st split-type gear is contained in the speed-increasing range of the 0th fully hydrostatic gear. A 1st split-type gear is thus nonexistent.

A fully hydrostatic startup is also possible when the 3rd gear is engaged, for instance, in that the turning gear is disengaged and the clutch (K4) of the 4th gear is already engaged in addition to the clutch (K33) of the 3rd gear.

It is advantageous that all the clutches (K1E, K3E; K2E, K4E) of the 4 selectable ratio gears and the shaft clutch (K5E) are disposed coaxially, so that a hollow shaft is dispensed with.

Synchronizing devices must be necessary either on the clutches (K1E, K3E) of the 1st and 3rd gear, and the clutches (K2E, K4E) of the 2nd and 4th gear, or on the shaft clutch (K5E) and the group shift clutches (K6E, K7E), or as provided in the shifting layout, on the clutches (K1E, K4E) of the 1st and 4th gears and on the shaft clutch (K5E).

The output shaft (ASW3) of the transmission leads for instance to a differential gear of a driven vehicle axle. Also, advantageously, a further power take-off on the group gear shaft (GW) is provided via a clutch (K) to an output gear (AG) for a second driven axle of a vehicle, for the sake of four-wheel drive.

The output shaft (ASW3) is coupled in group 2, by means of the second group clutch (K7E), directly to the intermediate shaft (W3A), so that in this group gear stage, only one toothed wheel gear is engaged under load. The advantageous result is a low lateral offset between the input shaft (EG) and the output shaft of the transmission block. In the first group stage, a linkage of the intermediate shaft (W3) via the group gear shaft (GW) and two further toothed wheel arrangements (ZG1, ZG2), which represent the group gear, is effected via the first group clutch (K6E). These intermediate gear stages of the group gear, because they are connected in series, each have a relatively low speed decreasing ratio.

The above-described transmissions can advantageously also be started up or braked fully hydrostatically in the speed ranges below 6th and below 8th gear, in that these gears 5× and 7× the turning gear (WG) is shifted in disengaged fashion, the shaft clutch (K5E) is closed and the other clutches (K2E, K7E; K4E, K7E) are engaged in accordance with the higher gear 7 or 8.

Starting up or braking in fully hydraulic operation is also possible in the other gears, if the clutches of the next-higher gear are jointly engaged, and the two intermediate shafts are connected to one another. This shifting layout is generally possible in the transmissions of this type, and is also possible in the transmissions of FIGS. 1 and 2.

For FIG. 7, the following layout of the clutches for fully hydraulic starting operation obtains:

| Up to gear | R/V | K1E | K2E | K3E | K4E | K5E | K6E | K7E |
|---|---|---|---|---|---|---|---|---|
| 2 |   |   | X | X |   |   | X | X |
| 3 |   |   | X | X |   |   | X | X |
| 4 |   |   |   | X | X |   | X | X |
| 5 |   | X |   |   | X |   | X | X |
| 6 |   | X | X |   |   | X |   | X |
| 7 |   |   | X | X |   | X |   | X |
| 8 |   |   |   | X | X | X |   | X |

Upon startup up to 5th gear, the linkage of the gear groups ensues via the simultaneously engaged group gear clutches (K6E, K7E), and the shaft clutch (K5E) is disconnected.

We claim:

1. A power transmission with a infinitely adjustable hydrostatic-mechanical power split by means of a hydrostatic variable-displacement gear (HG), a four-shaft double planetary gear (I, II) and following selectable ratio gears, wherein an input shaft (EW) is permanently operatively connected via a first spur gear (SG1) to the variable-displacement gear (HG) and can be coupled in a controlled manner to a drive shaft (EP1) of the rib of the second of the planetary gears (II) and of the outer wheel (AKI) of the first of the planetary gears (I), and an output shaft (KW) of the hydrostatic variable-displacement gear (HG) is connected via a toothed wheel stage (Z) to a sun wheel shaft (SW), on which the two sun wheels (SRI, SRII) of the planetary gears (I, II) are disposed, and a planet shaft (AP1) of the first planetary gear (I) is connectable in controlled fashion to a power take-off shaft (AW), via a first selectable ratio gear as well as an associated shift clutch, and an outer wheel shaft (AP2) of the second planetary gear (II) can be coupled in controlled fashion to the power take-off shaft (AW) via a further ratio gear as well as an associated shift clutch, characterized in that
- the input shaft (EW) is connectable to the drive shaft (EP1) by means of a turning gear (WG) that can be turned on and off;
- the planet shaft (AP1) is connectable via a startup shift clutch (K0, K0A, K0B)
- to the sun wheel shaft (SW), or
- to the outer wheel shaft (AP2), via one of the selectable ratio gears (G2, G4, 2, 4) disposed thereon, in that the outer wheel shaft can be coupled retroactively in succession with one of the adjacent-speed selectable ratio gears (G3, G5, 1, 3) disposed on the sun wheel shaft (SW), and
- that in a fully hydrostatic operating range, the turning gear (WG) is controllably disengaged and the startup shift clutch (K0, K0A, K0B) is closed.

2. The power transmission of claim 1, characterized in that double claw clutches (K1, K3; K2, K4; K5, K7) for the gear shifting of the 1st through 5th and 7th selectable ratio gears are respectively disposed on the power take-off shaft (AW), and the startup clutch (K0) and the clutch (K6) for the sixth selectable ratio gear is embodied as a double claw clutch, which when moved to one side of a neutral position couples the planet shaft (AP1) to the sun wheel shaft (SW) and when moved to the other side couples the sixth selectable ratio gear, one transmission wheel of which is rotatably supported on the planet shaft (AP1), to the planet wheel shaft.

3. The power transmission of claim 2, characterized in that the power take-off shaft (AW) is connected on one side to a rear-wheel drive (HA1) of a motor vehicle and on the other to a front-wheel drive (VA1).

4. The power transmission of claim 2, characterized in that the power take-off shaft (AW) is connected via a toothed wheel gear to a differential gear (DG), which is connected on one side to a rear-wheel drive (HA) of a motor vehicle and on the other to a front-wheel drive (VA).

5. The power transmission of claim 1, characterized in that transmission wheels of a 1st to 4th selectable ratio gear are rotatably supported on the power take-off shaft (AW1), which are respectively connectable to the power take-off shaft (AW1) by one part of one of a plurality of double clutches (K1A–K4A), and that one part of the double clutch (K3A) of the third selectable ratio gear (G3), together with the startup clutch (K0A), is embodied by means of a sliding sleeve (M) as a double clutch, which as a startup clutch (K0A), via the sliding sleeve (M), couples the third selectable ratio gear directly, successively retroactively, to the 2nd-speed gear (G2).

6. The power transmission of claim 5, characterized in that the power take-off shaft (AW1) is connected by a first higher-stage gear (GN1), to a differential gear shaft (DW) of an output-side differential gear (DG) via a shift clutch (K6A), and a further power take-off shaft (AW2) is rotatably supported on the power take-off shaft (AW1), is connected by a second higher-stage group gear (GN2) to the differential gear shaft (DW) and is connectable on one side to the power take-off shaft (AW1) by means of a synchronized clutch (K7A) and is connectable on the other side, via one part of one of the double clutches (K5A), to the 1st speed gear via a sliding sleeve, and that the coupling part (K4A) of the fourth selectable ratio gear is synchronizing.

7. The power transmission of claim 1, characterized in that respective double claw clutches (K1B, K3B; K2B, K6B; K5B, K7B) for the selectable ratio gears of one 1st through 3rd gear each and one 5th through 7th gear each are disposed on the power take-off shaft (AW3), and the startup clutch (K0B) together with the clutch (K4B) of a fourth selectable ratio gear (G4) forms a double clutch, which moved to one side of a neutral position couples a transmission wheel of the 4th gear selectable ratio gear (G4) to the power take-off shaft (AW3), and on the other side thereof couples the transmission wheel of the fourth selectable ratio gear (G4) via a sliding sleeve (M) to a transmission wheel of the 5th gear selectable ratio gear (G5).

8. The power transmission of claim 5 characterized in that the outside of the sliding sleeve (M) has an annular groove that is form-fittingly engaged by an adjusting means that acts bidirectionally with axial orientation, and that the sliding sleeve (M) has internal toothing on the one side, which is supported, form-fittingly and axially displaceably, in external toothing of a hollow shaft extension of the one of the transmission wheels (G4) and on the other side has internal toothing that is located centrally in a neutral position and when moved to one side form-fittingly and couplingly engages a toothed ring that is secured on the inner shaft (AW3), and when moved to the other side thereof form-fittingly and couplingly engages teeth on a hollow shaft extension of the other of the transmission wheels (G5).

9. The power transmission of claim 5 characterized in that the double clutch (K0A, K0B) with the sliding sleeve (M) is disposed axially parallel to and next to the double planetary gear (I, II).

10. The power transmission of claim 1, characterized in that the planet shaft (AP1) of the first planetary gear (I) is connectable in controlled fashion to a first intermediate shaft (W1, W2, W3), via a first selectable ratio gear and an associated 3rd gear shift clutch (K31, K3D, K3E), and the outer wheel shaft (AP2) of the second planetary gear (II) can be coupled in controlled fashion to the intermediate shaft (W1, W2, W3), via further selectable ratio gears and associated shift clutches (K2C, K4C, K2E, K4E) of a 2nd and 4th gear, and a transmission output shaft (ASW1, ASW2, ASW3) is connectable to the intermediate shaft (W1, W2, W3) via a first group gear and an associated first group shift clutch (K6C, K6E), and the transmission output shaft (ASW1, ASW2, ASW3) is connectable via a second group gear and an associated second group shift clutch (K7C, K7E) to a second intermediate shaft (W1A, W2A, W3A), which is connectable in controlled fashion to the first intermediate shaft (W1, W2, W3) by means of a 5th gear shift clutch (K5C, K5E).

11. The power transmission of claim 10, characterized in that the 3rd gear clutch (K31) is disposed on the planet shaft (AP1) of the first planetary gear (I) and with the planetary gear shaft clutch (K0) is embodied as a double clutch.

12. The power transmission of claim 11, characterized in that only the shift clutches (K4C, K5C) of the 4th and 5th gears have synchronizing devices, and all the other selectable ratio gear and group gear shift clutches (K0, K1C, K2C, K31, K6C, K7C) are embodied as simple claw clutches.

13. The power transmission of claim 10, characterized in that the planetary gear shaft clutch (K0) is a single clutch, and the 1st and 3rd gear clutches (K1C, K3D) are a double clutch.

14. The power transmission of claim 10 characterized in that the one of the intermediate shafts (W1A, W2A) is supported in the form of a hollow shaft on the first of the intermediate shafts (W1, W2).

15. The power transmission of claim 10 characterized in that the intermediate shafts (W3, W3A) are disposed coaxially beside one another and are connectable via a shaft clutch (K5E).

16. The power transmission of claim 15, characterized in that for startup, the respective turning gear clutches (R, V) are controlled to be disengaged, and the two intermediate shafts (W3, W3A) are connected to one another via the shaft clutch (K5E), and the intermediate shafts (W3, W3A) are each connected in a controlled manner to a shaft (AP1, AP2) of the planetary gear (I, II) via a selectable ratio gear of a 1st or 3rd gear and of a 2nd or 4th gear, in each case via an associated clutch (K1E, K3E; K2E, K4E).

17. The power transmission of claim 16, characterized in that only the clutches (K1E, K3E, K2E, K4E) of the 1st through 4th gears or the shaft clutch (K5E) and the group gear clutches (K6E, K7E) each have a synchronizing device.

18. The power transmission of claim 10 characterized in that the output shaft (ASW3) is disposed coaxially with the intermediate shaft (W3A) and is connectable directly to it by means of one of the group gear clutches (K7C, K7E).

19. The power transmission of claim 18, characterized in that the group gear comprises two toothed wheel gear stages (ZG1, ZG2), which are connected to one another via a gear shaft (GW) and by way of which one of the group gear clutches (K6E) can be coupled to one of the intermediate shafts (W3).

20. The power transmission of claim 19, characterized in that the gear shaft (GW) is connectable to a further output shaft via a clutch (K) and optionally an output gear.

21. The power transmission of claim 20, characterized in that the first of the output shafts leads to a differential gear of a first vehicle drive shaft, and the second output shaft leads to a second vehicle drive shaft of a four-wheel-drive vehicle.

22. The power transmission of claim 19 characterized in that the group gear clutches (K6E, K7E) are disposed coaxially with the intermediate shafts (W3, W3A).

* * * * *